No. 654,091. Patented July 17, 1900.
M. J. CUSHMAN.
COW MILKING MACHINE.
(Application filed Nov. 27, 1896.)
(No Model.) 4 Sheets—Sheet 3.
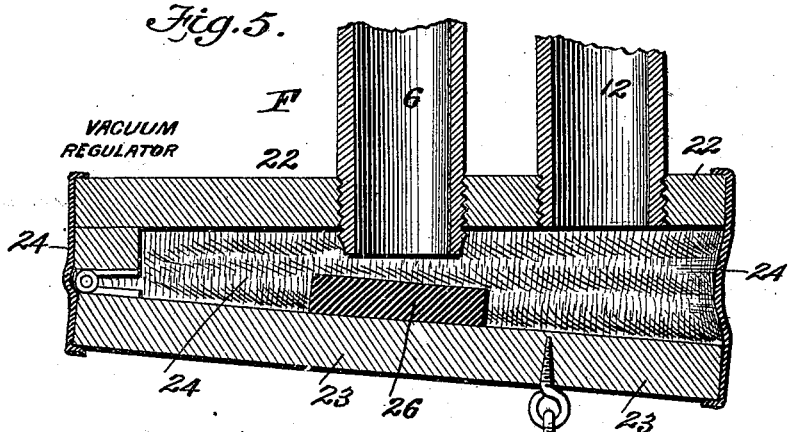
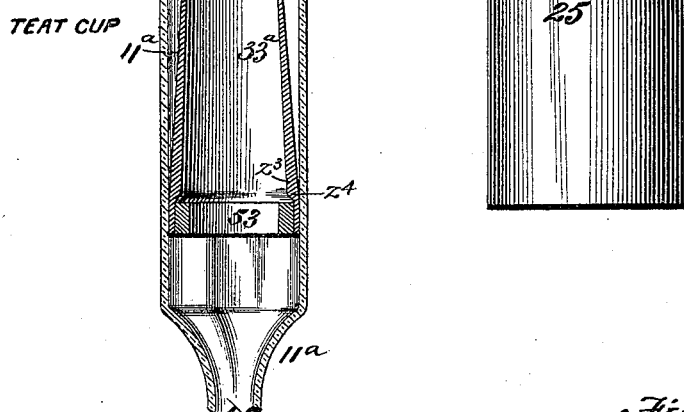
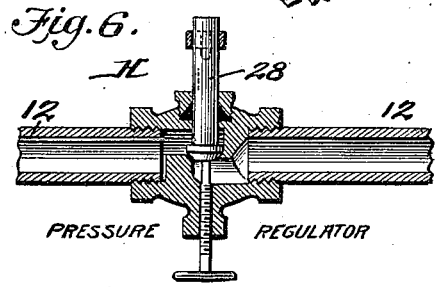
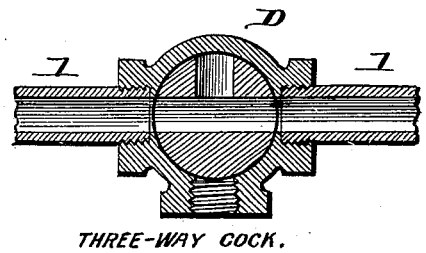
WITNESSES:
INVENTOR
M. J. Cushman,
BY
ATTORNEYS.

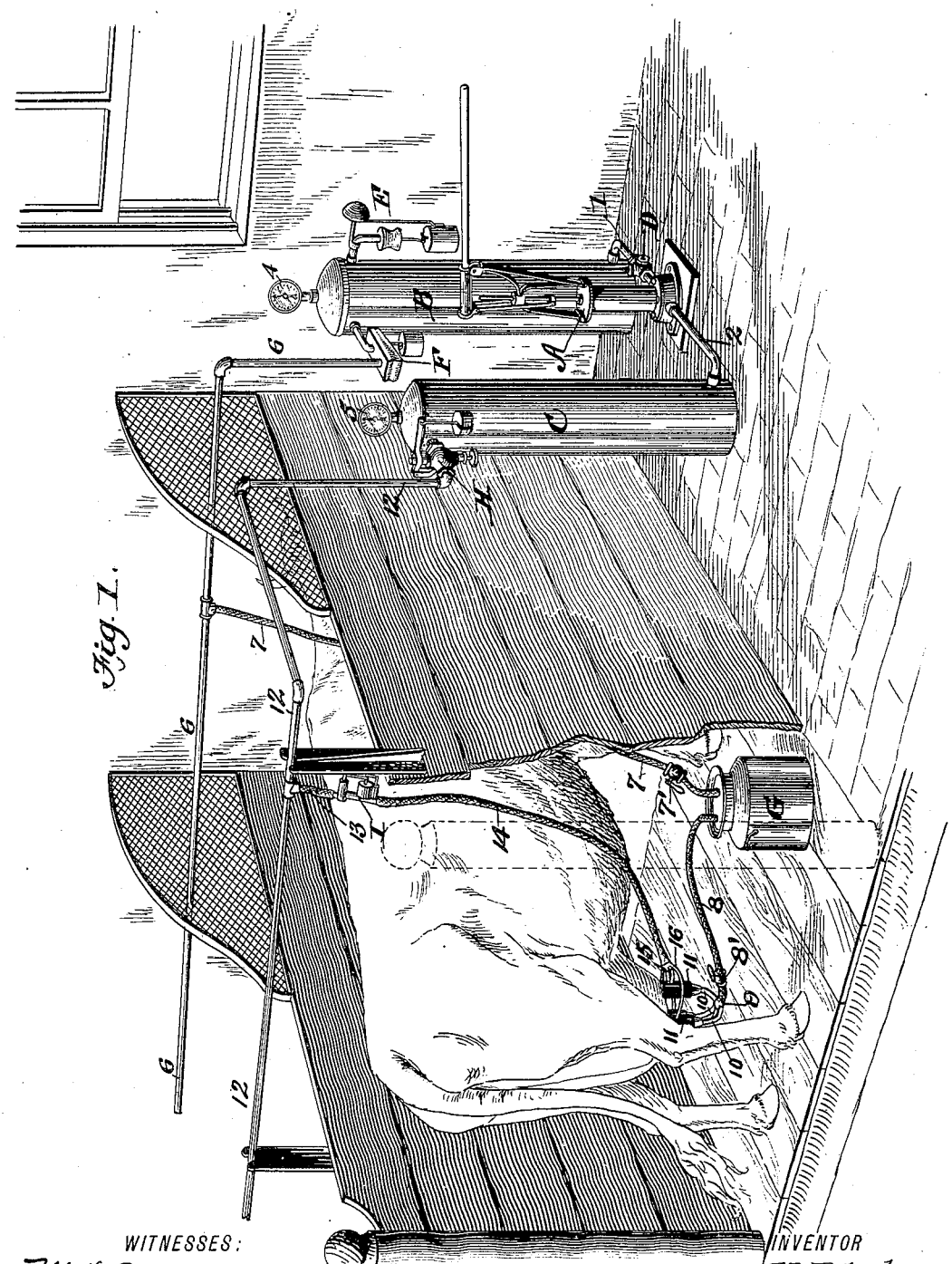

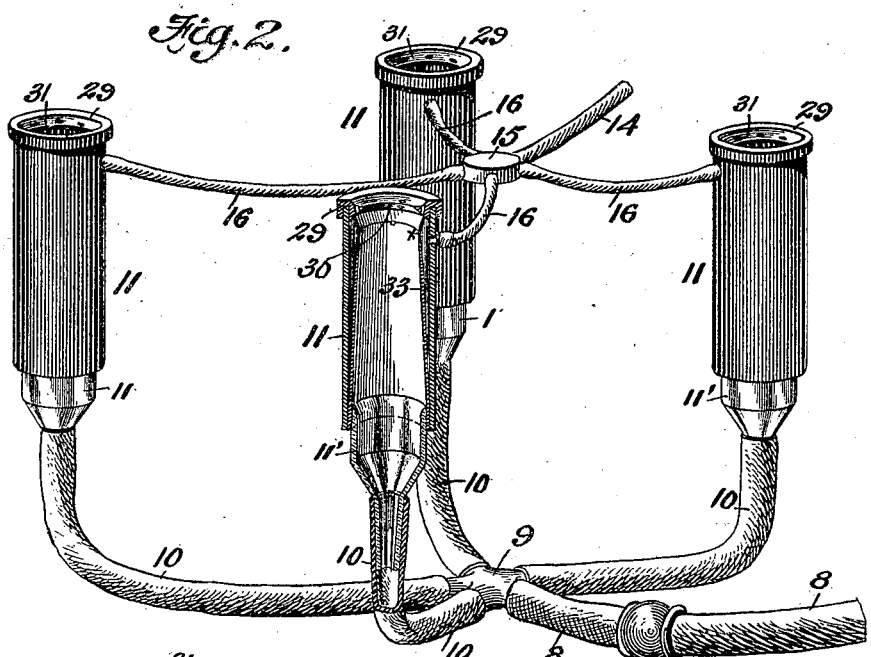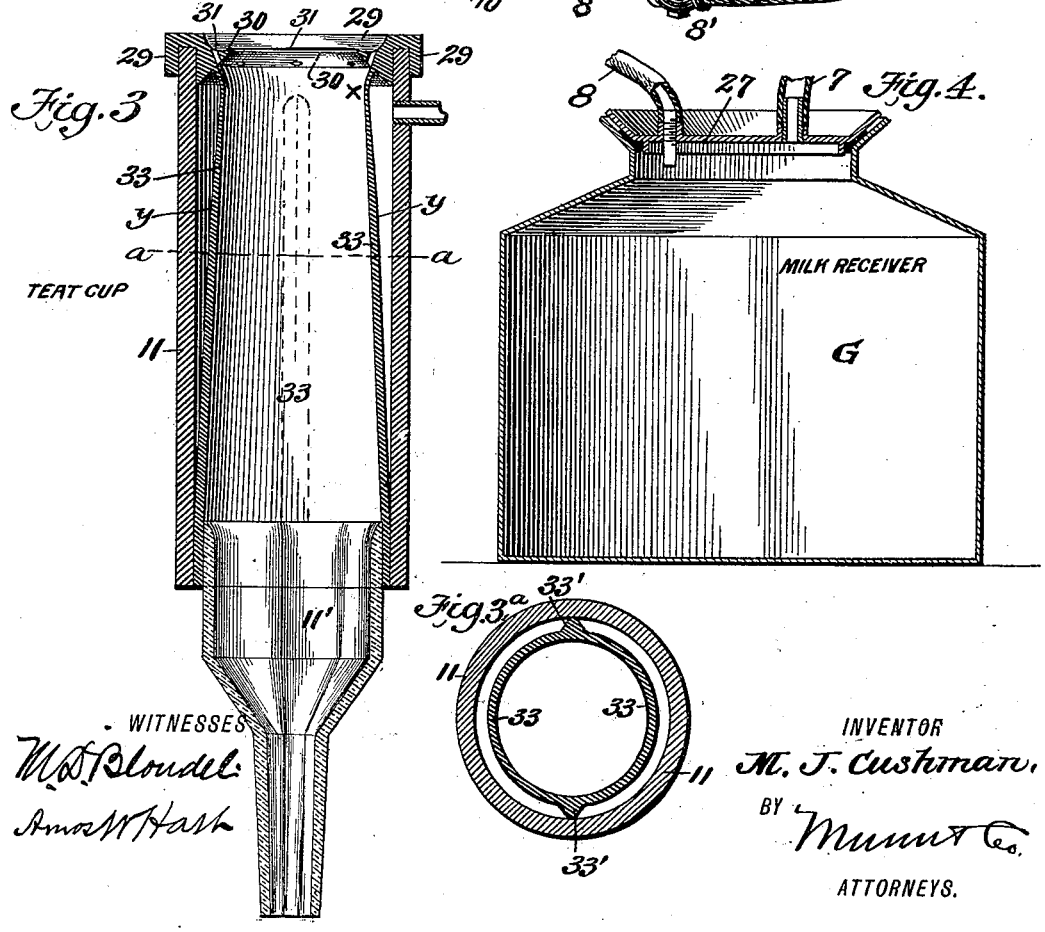

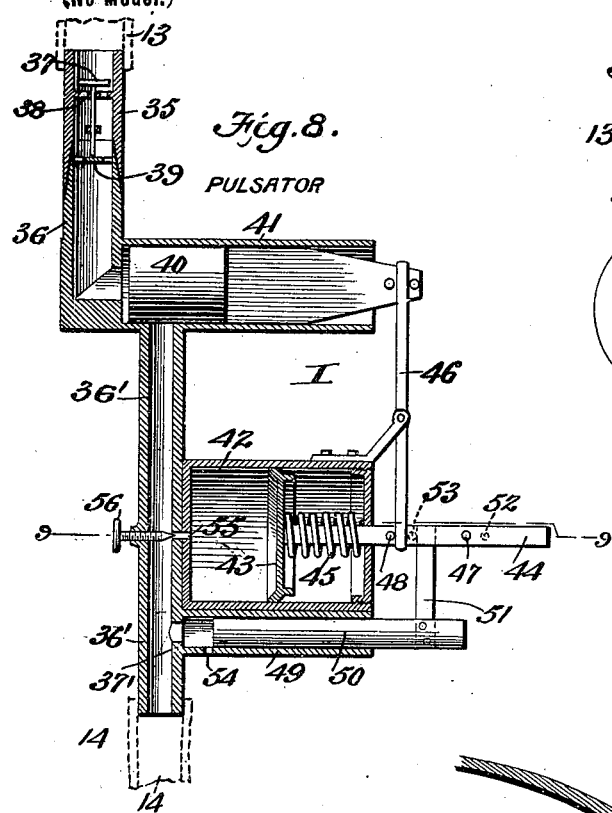
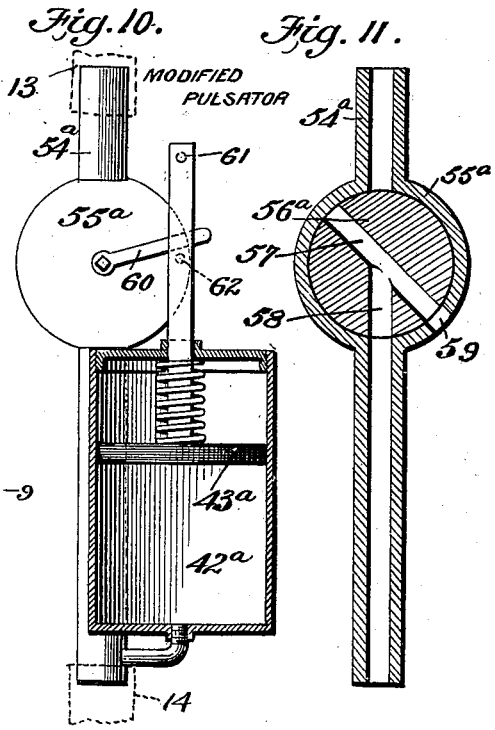
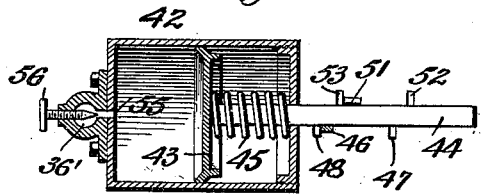
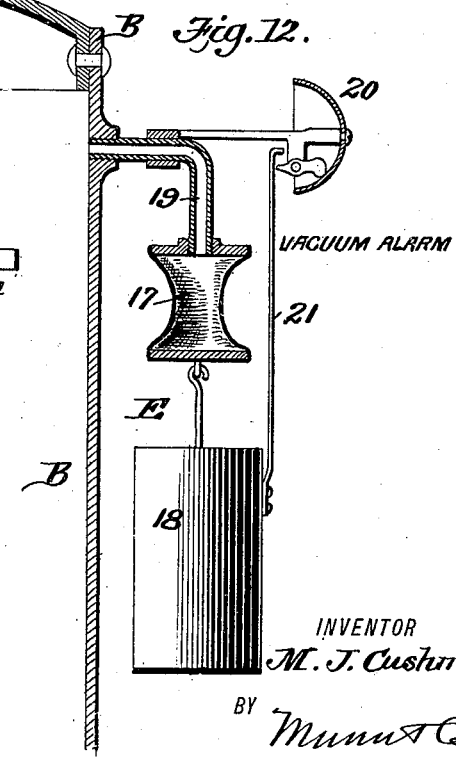

UNITED STATES PATENT OFFICE.

MODESTUS J. CUSHMAN, OF WATERLOO, IOWA.

COW-MILKING MACHINE.

SPECIFICATION forming part of Letters Patent No. 654,091, dated July 17, 1900.

Application filed November 27, 1896. Serial No. 613,648. (No model.)

*To all whom it may concern:*

Be it known that I, MODESTUS J. CUSHMAN, of Waterloo, in the county of Black Hawk and State of Iowa, have invented a new and useful Improvement in Cow-Milking Machines, of which the following is a specification.

I have devised and put in successful practical use milking-machines in which suction and traction are applied to the animal's teats and in which the air-vacuum in the teat-cups is made to alternately increase and decrease, thus closely simulating the action of the calf's mouth without injury to the teats or annoyance to the animal, so that a large yield of milk is obtained. My invention is an improvement in the same line.

In the accompanying drawings, four sheets, Figure 1 is a perspective view showing my machine as in use. Fig. 2, Sheet 2, is a perspective view, with part in section, of the teat-cups and the flexible tubes connected with them. Fig. 3 is an enlarged longitudinal section of one of the teat-cups. Fig. 3ª is a cross-section of the same on line *a a*, Fig. 3. Fig. 3ᵇ, Sheet 3, is a sectional view of a modification of the teat-cup. Fig. 4 is a vertical section of one of the milk pails or receivers. Fig. 5, Sheet 3, is an enlarged section of the automatic vacuum-regulator. Fig. 6 is an enlarged section of the automatic pressure-regulator. Fig. 7 is an enlarged section of the three-way cock attached to the pipe that connects the vacuum and compression cylinders. Fig. 8, Sheet 4, is an enlarged sectional view of the automatic pulsator. Fig. 9 is a section of a portion of such pulsator on line 9 9 of Fig. 8. Fig. 10 is a sectional view showing a modification of the pulsator. Fig. 11 is a sectional view of a portion of the modified pulsator. Fig. 12 is an enlarged sectional view of the automatic vacuum-alarm.

I will first indicate the chief parts or elements of my machine as shown in Fig. 1. An air-pump A is located between a steel vacuum-cylinder B and steel compression-cylinder C and connected with them by pipes 1 and 2, respectively. The pipe 1 is provided with a three-way cock D. The cylinders B and C have automatic gages 4 and 5 for indicating the degrees of vacuum and air compression, respectively. The cylinder B has also an automatic low-vacuum alarm E, attached as shown. A metallic suction or vacuum pipe 6 extends in practice along the top of the cow-stall or over the stanchions thereof and connects at one end with the vacuum-cylinder B, an automatic vacuum-regulator F being interposed, so as to form practically a part of said pipe. From the pipe 6 flexible branch tubes 7 extend down to milk cans or receivers G and are provided with stop-cocks 7'. A flexible tube 8 connects the receiver G with a five-way metallic union 9, from which short flexible tubes 10 extend to the teat-cups 11, the attachment being made at the reduced lower ends of the latter. Stop-cocks 8' are applied to the tubes 8, as shown. A metallic pipe 12 extends along the stall over the backs of the cows, an automatic pressure-regulator H being interposed, so as to form an attachment and practically a part of the pipe, as shown. From the said pipe 12 a series of flexible tubes 13 lead down to automatic apparatus I, which I term "pulsators," the same being shown enlarged and in detail in Figs. 8 and 9, and from the said pulsators flexible tubes 14 extend to metallic unions or connecting-pieces 15, which are connected by short flexible tubes 16 with the sides and upper portions of the teat-cups 11.
I will now describe the details of construction and operation of the several parts of the machine so far as necessary to a full understanding of the essentials.

The three-way cock D is shown in section in Fig. 7, and it is apparent its plug may be so adjusted as to maintain an open passage between the pump A and cylinder B or to close such passage and allow free admission of air to pipe 1, and thus to the pump.
The low-vacuum alarm, Fig. 12, consists of the following parts: An expansible air-holder 17 is formed of two rigid disks and an air-tight flexible tube that connects them. A weight 18 depends from the same and holds it normally expanded, while a rigid pipe 19 connects it with the cylinder or tank B. A bell 20, similar to a well-known type of door and table bell, is attached to a rod that extends from the pipe 19, and a wire 21 connects the bell with the weight, so that the bell is sounded whenever the weight descends far enough by reason of the degree of vacuum in B falling below a certain prescribed limit.

The automatic vacuum-regulator F is shown in section in Fig. 5. It is in the nature of a bellows, it being constructed of two oppositely-arranged plates 22 and 23, which are hinged together at one end and connected all around by a flexible air-tight fabric 24. The vacuum and compression pipes 6—that is to say, the pipe 6 and the short pipe that connects the vacuum-cylinder and the vacuum-regulator—are attached to the upper side 22 of the regulator F, and a weight 25 depends from the lower one 23. On the inner side of the lower plate is secured a rubber block 26, on which the pendent end of pipe 6 seats when the regulator is collapsed. In place of this specific form of regulator I may use various other types.

The milk can or receiver G, Fig. 4, is provided with an air-tight, but easily-removable, cover 27, having an elastic packing-ring, as shown, and the flexible tubes 7 and 8 are detachably connected with the cover by means of nipples.

The air-pressure regulator H, Fig. 6, has a sliding piston-valve 28, which is weighted exteriorly to regulate the pressure in the metallic pipe 6 and its connections.

The teat-cups 11 (see Figs. 2 and 3) have an elongated tubular body made of some duly-rigid material, such as metal, glass, and hard or semihard rubber. A molded and recessed soft-rubber ring 29 is fitted on the upper edge of the cup and provided with an inwardly-projecting acute-angled rib 30, which has a shallow groove 31 in its upper side and a series of small transverse perforations. Within the cup 11 is a soft-rubber cylinder or tube 33, whose upper end is joined to the inner portion of ring 29 by vulcanization or some other method capable of producing an air-tight union. This tube 33 is very thin at a point $x$ contiguous to the ring 29 and becomes gradually thicker thence downward to the point $y$ for a purpose to be presently explained. From $y$ to its lower end the tube is of uniform thickness. It will be noted that the form of the tube 33 is such that its diameter is least at $x$ and greatest at the lower end. The lower reduced end 11' of the cup 11 is preferably made of glass in any case to allow convenient inspection for determining the flow of milk through the same.

As shown in Fig. 3ª, the inner rubber tube 33 of the teat-cup has two lengthwise ribs or thickened portions 33', that are arranged diametrically opposite, the same extending from the upper end $x$ to the lower end. The purpose of these two ribs and their specific arrangement is to permit or cause the tube to collapse bodily from end to end at all points between the ribs. In other words, the two wide and plain or ribless portions that form opposite sides of the tube collapse and fold practically flatwise upon each other when subjected to air-pressure, and thus the teat is acted on in such a manner as to express the milk completely.

The automatic pulsator I, Figs. 8 and 9, has the following construction: As shown, it is interposed between the compression-pipe 12 and each set of teat-cups 11. The flexible tube 14 is attached to it at one end, and the tube 13 has a detachable connection at the other—that is to say, the tube 13 is applied to a rigid tube 35, which has a ground-joint connection with the end of a tube 36, arranged at the base of the pulsator. The said joint is preferably of the scarf variety to insure a close fit of one part on the other and yet permit easy disconnection. Within said tube 35 is a slidable valve 37, having an annular seat 38. This valve is normally seated by air-pressure in pipe 12 and tube 13, but is opened, as shown in Fig. 8, when the tube 35 is slipped on or joined to the pulsator-tube 36, since the valve-stem then comes in contact with a skeleton diaphragm 39 in said tube 36. An elongated piston 40 works in a cylinder 41 and at a right angle to tube 36, and when seated this piston cuts off passage between the tube 36 and another, 36', which is arranged in a parallel plane, but out of alinement with the former, 36. A larger cylinder 42 is arranged parallel to the aforementioned cylinder 41 and has a flat or disk piston 43, having a rod 44, that is encircled below the head of the cylinder by a spiral spring 45, so that the piston is normally pressed downward. A lever 46 is pivoted centrally to a bracket attached to the cylinder 42 and loosely engages the piston 40 and piston-rod 44—that is to say, one end of said lever works between pins projecting laterally from the piston 40 and the other end lies alongside the piston-rod 44, which is provided with lateral pins 47 and 48, that are separated vertically by a considerable space, for a purpose hereinafter stated. A third cylinder 49 is arranged parallel to 41 and 42, and an elongated piston 50 works therein and is provided with a rigid lateral arm 51, whose free end is arranged to contact with lateral pins 52 and 53, that are fixed in the piston-rod 44 on the side opposite the others, 47 and 48, before mentioned, and are, like them, separated by a considerable space. The cylinder 49 has a small lateral hole 54 near its lower end and a hole 37' at the bottom. The larger cylinder 42 also communicates with the tube 36' by means of a small passage 55, in which a stop-cock 56 is arranged.

The operation of my improved machine will now be understood from the following statement: The cock or valve D being so adjusted as to open passage between vacuum tank or cylinder B and pump A, the latter is worked to exhaust air from B and force it into tank C until the gages 4 and 5 record a vacuum of, say, twenty inches and a compression of ten pounds or more, respectively. The cock D is then turned, Fig. 7, to cut off communication between pump A and vacuum-cylinder B and allow air from the outside to be drawn into the pump and compressed in cylinder C. It is obvious that the vacuum created in cylinder B extends also to the regulator F, pipe 6, and tubes 7, down to the cocks or valves 7' in the latter. The regulator F is held expanded and open by its appended weight, which is regulated in size to correspond with the degree of vacuum required, which is ordinarily five inches. It is evident that when the vacuum in B attains a certain degree, or sufficient to overcome the weight, the lower plate 23 of said regulator will rise until the cushion 26 abuts the end of pipe 6, whereby further exhaustion of air from the latter will be prevented, and from that time the vacuum can obviously be increased in B without increasing it in pipe 6 and its connections, thus enabling the cylinder B to be exhausted to a high degree. It will be further seen that the alarm-cylinder 17 must also collapse as soon as the vacuum suffices to raise its weight 18, and when this is done the wire 21 may be hitched onto the bell 20. The degree of compression of air in tank or cylinder C will obviously extend to pipe 12 and tube 13 down to the automatic valve which forms part of the pulsator I. The air-pressure regulator H is always open until the air-pressure in pipe 12 reaches the desired point, which is determined by the weight applied to the lever of the regulator. When the pressure overcomes this, the valve necessarily closes and cuts off further passage of air from the cylinder C, so that any further desired degree of pressure can be created in cylinder C. In brief, air may be stored in the latter to any desired degree for the requirements of future use. The machine is now ready for use in milking. The operator first connects flexible tube 7 with one of the nipples of the can or receiver cover 27 and opens valve 7', which obviously allows air to be drawn from the receiver G, so that the vacuum therein equals that in tube 7 and pipe 6. The cups 11 are then slipped on a cow's teats, so that the rubber ring comes in contact with the base or root of the same. The valve 8' is then opened and the suction thus created will at once cause the cups to take a firm hold on the teats at the root. This hold is increased or tightened by reason of the groove and perforations in the ring, since the perforations allow the skin to be drawn tightly into the groove. It is apparent that the air drawn from the teat-cups 11 and receiver G will lower the vacuum in pipe H and regulator F, so that the weight attached to the latter overcomes the exterior air-pressure and pulls down the lower hinged plate 23 of said regulator, and thus opening passage to pipe 6, when the higher vacuum in cylinder B instantly draws in the surplus air and restores the vacuum in regulator F and pipe 6, so that the weight is again raised and the cushion-valve 26 closed in the mouth of pipe 6, as before. This operation of the regulator F is repeated whenever the vacuum in pipe 6 is decreased in the least by admission of air. It is apparent the flow of milk into the receiver G will have the same effect, since it takes up vacuum therein. Having attached the teat-cups 11 and the vacuum having been automatically applied, as above described, the operator next connects the flexible tube 13 with the pulsator I, which is done by slipping the rigid tube 35 on the tube 36. When this connection is made, the valve 37, which was previously seated, is opened by reason of its rod striking on the diaphragm or abutment 39 in tube 36, so that the air-pressure in the pulsator I instantly equals that in pipe 12. When no air-pressure is on the pulsator, the spring 45 of piston 43 will force the latter to the bottom of its cylinder 42, and thus by means of the lever 46 coming in contact with the pin raise the piston 40 and at the same time lower piston 50, so that the passages at the bottom of cylinder 49 are closed, which permits air-pressure to pass beyond the pulsator into the tubes 14 and 16 and the space between the teat-cup proper, 11, and its contained rubber teat-tube 33. It is apparent the air-pressure must cause the tube 33 to press inward upon the teat, and, following the lines of least resistance, the compression will chiefly be effected on those sides of the tube 33 that are between the ribs 33' and at the upper end $x$ of said tube, where it is thinnest. In other words, the compression thus begins at $x$ and the teat is first constricted near the root, since the tube 33 yields readily at that point. The pressure then gradually proceeds downward to the lower end of the teat, which is pressed last. This operation is exceedingly effective, since it consists in squeezing and pulling, and suction being also simultaneously applied the action closely approximates that of the calf's mouth. It will be seen that independently of the sucking or exhaustion of air the action is quite similar to hand-milking. The teats having been compressed, as above described, the next step is to relieve them of air-pressure and allow them to again expand and fill with milk. This is effected as follows: The air-pressure passes from tube 36' through the passage into cylinder 42 and forces the piston upward against the tension of the spring 45 until the pin strikes the lever 46, which forces piston 40 down and closes the passage between tubes 36 and 36'. Simultaneously with this movement the pin comes in contact with the arm of piston 50 and raises the latter, thus opening the passage 54, and which permits air-pressure in the milk-tubes to escape and destroys the pressure in the teat-cups 11, so that the teat compressors or tubes 33 relax and resume their original position. It is evident that when the air-pressure is relieved in tube 36' it is also destroyed in cylinder 42, which permits the spring 45 to again force the piston 43 downward, and thus by the action on the arm 51 causes the piston 50 to descend in cylinder 49 and close the lateral air-inlet thereof and at the same time open the passage from tube 36' to 36, and thus again allow air to enter the teat-cups 11 and compress the teats, as before. Thus the operation goes on until arrested by the operator, the pulsator acting once for each expulsion of milk from the teats. The rapidity of succession of the pulsations is determined mainly by the time required for the air to enter the large piston-cylinder 42 through the passage, and this may be regulated at will by means of a gage-screw 56, whose pointed end enters said passage, as shown, Fig. 8. The passage being narrow, the air-pressure in piston-cylinder 42 is not created as soon as in 36', nor when the piston 43 rises can air escape from cylinder 42 as quickly as from tube 36'. Obviously when the air-pressure is destroyed by the pulsator I in pipe 12 the regulator H immediately opens the passage to compression-cylinder C, so that the pressure in 12 is immediately restored, and hence remains practically uniform during the entire milking operation. The flow of milk from each teat can be observed through the glass portion 11' of the teat-cup, and when the flow ceases the cow has been milked dry, and the operator pulls tubes 35 and 36 apart and the valve 35 in the former at once closes automatically, so as to prevent escape of air from tube 13 and pipe 12. The valve 8' is then closed by the operator and the cups 11 are pulled off the teats.

If the can or receiver G is large enough, it can be attached to the part of the apparatus applied to another cow, or, if preferred, the valve 7' can be closed and valve 8' opened and the vacuum thus destroyed in G, so that its lid may be taken off and the can emptied. If at any time in the milking operation the vacuum falls below the desired limit, which is regulated by the weight 18 of regulator E, the said weight 18 will overcome the vacuum in air-holder 17 and descending pull the wire 21, and thus sound the bell 20, which notifies the operator, who will then work the pump A anew and increase the vacuum and air-pressure in cylinders B and C, respectively. The weight 18 therefore rises to its original place and the bell stops ringing.

It will be understood that the teat-cups are usually applied to a number of cows successively, and the milking operation begins when the first one has been applied. When one operator attends to the machine alone, he usually milks five to seven cows at a time, and consequently uses a like number of cans or receivers G. Thus there is a set of teat-cups and one pulsator for each can. It will be seen that by my improved method suction, pressure, and traction are simultaneously applied. The teat-cup $11^a$ (shown in Fig. $3^b$) differs from the preferred construction in the following particulars: The body of the cup is made of glass. The elastic teat-tube $33^a$ is made of the same diameter, but gradually increased thickness from $z^2$ to $z^3$, and the lower end $z^4$ is made thin, like the upper end, and is held by friction between the body of the cup and an inserted ring 53. The latter is preferably made of semihard rubber. This teat-cup operates like the other, 33. When air is admitted, the tube $33^a$ contracts bodily on the teat first at $x$, and then the compression gradually extends from $z^2$ downward to $z^3$.

The modified form of pulsator shown in Figs. 10 and 11 is distinguished by the following differences: A single piston-cylinder $42^a$, having a spring-pressed piston $43^a$, is connected by a small tube $54^a$ with the tube 14. A cylindrical casing $55^a$ is attached to said tube and contains a rotary circular valve $56^a$, having a diametrical passage 57, adapted to register with the tube 14, and a lateral passage 58, adapted to register with a lateral opening 59 in the casing. The rotary valve 56 has a rigid lever-arm 60, that is arranged to come in contact alternately with pins 61 and 62, fixed in the rod of the piston. Normally the spring holds the piston $43^a$ at the bottom of the cylinder $42^a$, so that the lever-arm 60 is in such position as to hold the valve $56^a$ with its main passage open, or, in other words, with its diametrical passage coincident with the tube 14 and the connected tube 13. When air-pressure is admitted to the tube 13, it obviously passes onto the teat-cups and also slowly enters the cylinder $42^a$ and forces the piston $43^a$ upward, whereby the lever-arm 60 is tilted and the valve $56^a$ consequently rotated to close the main passage 57, (see Fig. 11,) so that the air-pressure is shut off and the lateral passages 58 and 59 opened, which permits air to escape and destroy the pressure in teat-cups and pulsator I. As the air escapes from $42^a$ the piston $43^a$ descends, and as pin 61 strikes the lever-arm 60 the valve $56^a$ is again turned to bring it back to the original position.

I desire it understood that I do not propose to restrict myself to the details of construction and arrangement of parts before described, but to adopt any that are equivalent or within the spirit of my invention.

I do not restrict myself to the use of air for applying pressure in the teat-cups, since even a liquid may be employed for the purpose. Nor is the use of the machine intended to be restricted to cows alone.

What I claim is—

1. In a cow-milking machine, the combination with teat-cups, pipes and tubes leading thereto, a vacuum-producing apparatus and an air-compression apparatus, of an automatic regulator composed of an expansible air-box having a movable portion or side which closes the outlet-pipe when the tension of the vacuum reaches a predetermined point, and a weight pendent from such movable side, to add resistance of the latter foreclosure on said pipe, as shown and described.

2. An automatic vacuum-regulator composed of an expansible air-box, having a movable portion which is adapted to seat upon and close the air-outlet pipe connected with said air-box, and a means for resisting such closure, as shown and described.

3. In a cow-milking machine, the combination with the teat-cups, milk-receiver, systems of pipes and tubes, and a vacuum and compression apparatus, of an automatic low-vacuum alarm, composed of an expansible weighted air-holder, an alarm proper, and a device connecting the latter with the air-holder, as shown and described.

4. The pulsator for use as specified; composed of an air-cylinder, having a compressed-air inlet and outlet as specified, a piston held normally depressed in said cylinder, a compressed-air-cut-off mechanism which is connected with and operated by such piston, substantially as shown and described.

5. The improved pulsator composed of a compressed-air cylinder, having an air inlet and outlet, a piston adapted to reciprocate in said cylinder, means for holding the piston normally depressed, an adjacent piston or slide and air-passages which are controlled by such piston, and means for connecting the pistons and causing one to operate the other for opening or closing the air-passage, as shown and described.

6. The improved pulsator composed of a main air-cylinder having a base air inlet and outlet, a piston therefor, and a spring for holding it normally depressed, the adjacent piston-cylinders one having an air-inlet, and air-cut-off pistons slidable therein, tubular connection between the two cylinders and a lever connection between the several pistons, whereby the movement of the main piston causes like movement of the others, substantially as shown and described.

7. The combination, with a pulsator proper, and a tube forming part of the air-compression system, of a tubular connecting-piece adapted to form an air-tight detachable connection with said tube and having a valve which is normally seated and provided with a stem extending in a guide, and a fixed abutment or diaphragm arranged in said tube, in proximity to the valve, so that the valve-stem is in contact with it, when the tubular parts are connected, as shown and described.

8. A teat-cup composed of an outer rigid tube and a flexible inner one joined to a compressible ring having a groove in its upper side, and a series of perforations extending down from such groove and opening on the under side of the ring within the flexible tube, as shown and described.

9. A teat-cup composed of a rigid outer tube, a flexible inner tube, a ring fitted on the rigid tube, and having an inwardly-projecting portion provided with a series of perforations opening on the under side within said flexible tube which is joined to the ring as specified.

MODESTUS J. CUSHMAN.

Witnesses:
WARREN CRANSTON,
J. M. PUTNAM.